(12) United States Patent
Rattner et al.

(10) Patent No.: US 8,196,142 B2
(45) Date of Patent: Jun. 5, 2012

(54) USE OF EXTERNAL SERVICES WITH CLUSTERS

(75) Inventors: Martin Henry Rattner, Los Altos, CA (US); Nicholas Aaron Solter, Colarado Springs, CO (US); Gia-Khanh Nguyen, Santa Clara, CA (US); Hariharan Kolam Govindarajan, Stony Brook, NY (US); Bharath Venkatakrishnan, Chicago, IL (US); Milind Joshi, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1203 days.

(21) Appl. No.: 11/959,360

(22) Filed: Dec. 18, 2007

(65) Prior Publication Data
US 2009/0158292 A1 Jun. 18, 2009

(51) Int. Cl.
G06F 9/46 (2006.01)
G06F 15/173 (2006.01)
(52) U.S. Cl. ........................ 718/104; 709/226
(58) Field of Classification Search .......... None
See application file for complete search history.

(56) References Cited

U.S. PATENT DOCUMENTS

| 6,243,825 | B1 * | 6/2001 | Gamache et al. ............. 714/4.4 |
|---|---|---|---|
| 6,847,970 | B2 * | 1/2005 | Keller et al. ........................ 1/1 |
| 2004/0049509 | A1 * | 3/2004 | Keller et al. .................. 707/100 |
| 2008/0253393 | A1 * | 10/2008 | Blackburn et al. ........... 370/468 |

OTHER PUBLICATIONS

Information Sciences Institute, University of Southern California, RFC 793, "Transmission Control Protocol, DARPA Internet Program Protocol Specification," 89 pages, Sep. 1981.
Kolam, Hariharan et al., "Implementation of offline-restart flavor of dependency in High Availability Clusters," Research Disclosure Journal, Kenneth Mason Publications Ltd., Westbourne, Hants, UK 7 pages, Nov. 2006.
U.S. Appl. No. 11/777,184, Martin H. Rattner et al., filed Jul. 12, 2007.

* cited by examiner

*Primary Examiner* — Camquy Truong
(74) *Attorney, Agent, or Firm* — Osha • Liang LLP

(57) ABSTRACT

A method, apparatus, and system are directed toward managing a system that includes a cluster and an external resource. The external resource may be part of a second cluster that is collocated on the same hardware platforms as the cluster. A proxy resource is used to enforce a dependency relationship between a native resource of the cluster and an external resource, such that a dependency with the proxy resource serves to enforce a dependency with the external resource. The cluster framework may maintain states of the proxy resource, including an offline state, an online-standby state, and an online state. The online-standby indicates that the proxy has been started, but it has not determined that the associated external resource is enabled. The proxy may determine whether the external resource is enabled or disabled and, in response, notify the cluster framework.

7 Claims, 9 Drawing Sheets

USE OF EXTERNAL SERVICES WITH CLUSTERS

TECHNICAL FIELD

The present invention relates generally to network communications, and more particularly, but not exclusively, to managing relationships with external services by a cluster framework.

BACKGROUND

Clustering of computer systems is becoming an increasingly popular way for enterprises and large businesses to ensure greater availability to multiple users. Different types of clusters have evolved, including high availability (HA) clusters, high performance clusters, load balanced clusters, and the like. Examples of clustering systems include the Veritas™ Cluster Server, HP Serviceguard, and/or Microsoft Cluster Server. High Availability clusters are a class of tightly coupled distributed systems that provide high availability for applications typically by using hardware redundancy to recover from single points of failure. HA clusters typically include multiple nodes that interact with each other to provide users with various applications and system resources as a single entity. Each node typically runs a local operating system kernel and a portion of a cluster framework.

In the event of a hardware or software failure, an HA cluster automatically restarts applications on the same node or "fails over" (i.e., restarts applications on a different node) the applications in order to keep applications available to clients of the cluster. Conventionally, the cluster software is responsible for starting/restarting applications on one or more nodes of the cluster.

Individual software components on an HA cluster may be configured as resources or services. A resource or service might be any component that is capable of readily being relocated from one node to another node. The term "resource" is used herein to refer to a resource or a service. Typical examples of resources include disk volumes, network addresses, software processes, or the like. A group of resources or services that run together on the same node is known as a resource group.

An HA cluster typically employs an API to enable communication between a resource and other components. One API includes a callback mechanism, in which a resource or service registers one or more callback functions to be invoked when communication with or control of the component is desired.

Often a resource or service might require the services of another resource or service. For example, a software application might require a disk volume. Typically, a cluster includes a mechanism for maintaining information regarding dependencies among resources or services. A cluster may use this information, for example, to start a first service prior to starting another service that is dependent on the first, or to shut down the second, dependent service prior to shutting down the first service.

A cluster may require resources or services that are external to the cluster. This may require techniques or mechanisms that differ from those used when employing resources or services of the cluster. It is with respect to this consideration and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
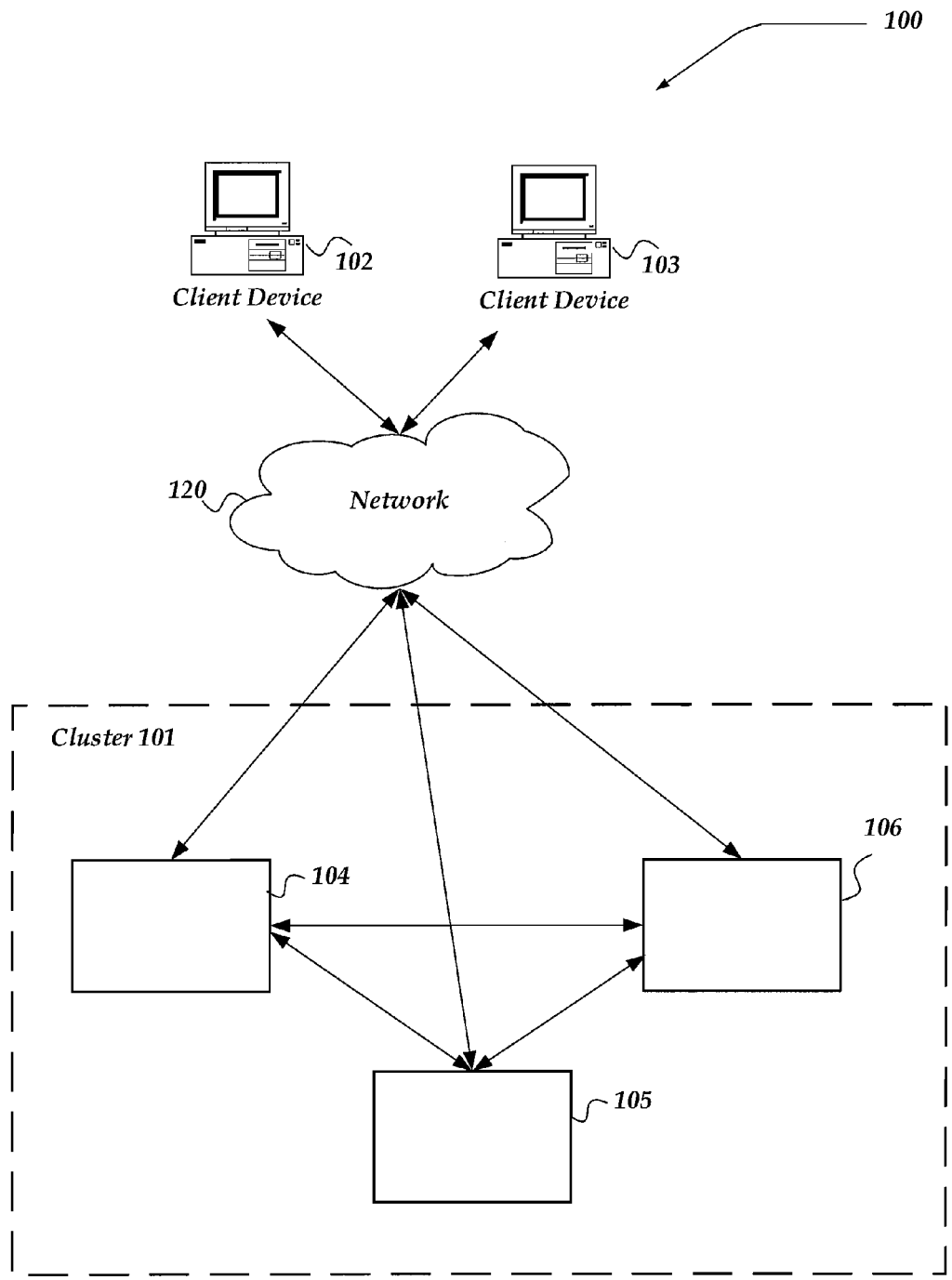
FIG. 1 shows a block diagram illustrating one embodiment of an environment for practicing the invention.

The invention now will be described more fully hereinafter with reference to the accompanying drawings, which form a part hereof, and which show, by way of illustration, specific exemplary embodiments by which the invention might be practiced. This invention might, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention might be embodied as methods or devices. Accordingly, the invention might take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it might. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "network connection" refers to a collection of links and/or software elements that enable a computing device to communicate with another computing device over a network. One such network connection might be a TCP connection. TCP connections are virtual connections between two network nodes, and are typically established through a TCP handshake protocol. The TCP protocol is described in more detail in Request for Comments (RFC) 793, which is available through the Internet Engineering Task Force (IETF). A network connection "over" a particular path or link refers to a network connection that employs the specified path or link to establish and/or maintain a communication.

A "cluster" refers to a collection of computer systems, redundant resources distributed among computer systems, or "cluster nodes" that are managed as a single entity, and provide services that may reside on a single cluster node and be moved among the cluster nodes. A cluster may improve the availability of the services that it provides, by providing redundancy or moving services among the nodes to handle failures.

The term "cluster node" or simply "node" refers to a computing element that is one logical part of a cluster. A node might include a physical device, such as a computer, or the like, and cluster may refer to a collection of such nodes. A node may also be a virtual operating environment running on a physical device (i.e., a virtual node), and a cluster may refer to a collection of such virtual nodes. One or more software components enabled to execute on a physical device may be considered to be a node. A node might be a virtual operating environment or virtual machine. Examples of virtual cluster nodes include Solaris™ containers or zones, IBM™ virtual machines, Solaris™ Logical Domains (LDOMs), Xen™ domains, VMware™ "virtual machines" or the like. In one embodiment, a node might be connected to other nodes within a network. As used herein, the term node refers to a physical node or a virtual node, unless clearly stated otherwise. The term cluster refers to a cluster of physical or virtual nodes, unless clearly stated otherwise. Two or more clusters may be collocated on the same set of physical nodes. In such a configuration, each cluster may be referred to as separate virtual clusters, or they may be referred to as two clusters that share hardware platforms.

As used herein, a cluster "resource" refers to any service, component, or class of components that may be provided on multiple cluster nodes. Resources might include instructions or data. Examples of resources include disk volumes, network addresses, software processes, file systems, databases, or the like. The term "resource group" refers to any group or collection of resources that run together on the same node. An "instance" of a resource refers to a specific component of the class of resource referred to. An instance of a resource may include one or more of an executing thread or process, data, an address, or a logical representation of a component.

As used herein, the term "dependency relationship" refers to an indication that one resource is to act in a particular manner based on the state of another resource. A resource that is dependent on the state of another resource is called a "dependent resource" or simply "dependent." A "dependee resource" or simply "dependee" is the resource upon which a dependent resource depends. Dependency relationships are generally directed and acyclic. In other words, the relationships between resources might form a directed acyclic graph (i.e., there are no cycles, and the relationships are one-way). A dependee resource may have one, two, or more corresponding dependent resources, and a dependent resource may have one, two, or more corresponding dependee resources. As used herein, a directed graph of resources contains nodes representing each resource such that "source nodes" represent dependent resources that have no dependent resources in the graph, and "sink nodes" represent dependee resources that do not depend on any other resources in the graph.

As used herein, the term "declaring" refers to encoding and/or storing information in a physical form, such as on a computer readable medium. Declaring a relationship refers to encoding and storing information about a relationship, such as the identity of a dependent, a dependee, a relationship type, or the like. The declaration might use any mechanism, including a user interface, a configuration file, a property list, a database, or the like.

Briefly stated, the present invention is directed towards managing a system that includes a cluster and an external resource. The external resource may be part of a second cluster that is collocated on the same hardware platforms as the cluster. Dependencies of a cluster resource on the external resource may be handled by employing a proxy resource associated with the external resource. The cluster framework may maintain a configuration of dependencies, such that a virtual dependency on the external resource is handled by having a dependency on its associated proxy resource.

In one aspect of the invention, a cluster framework may maintain state information for proxy resources, including states of offline, online-standby, and online. The online-standby state may correspond to a proxy resource that has been started, but where it is not known whether the associated external resource is enabled. Upon determining that the external resource is enabled, the state may change to online.

In one aspect of the invention, a cluster framework may receive a dependency relationship specifying that a native cluster resource depends on an external resource, enable a proxy resource associated with the external resource, and configure a state of online-standby for the proxy resource. The cluster framework may then receive information indicating that the external resource is enabled and configure a state of online for the proxy resource, indicating that the external resource is enabled. In response to the change of state, the cluster framework may start the native cluster resource that depends on the external resource.

In one aspect of the invention, the proxy resource may invoke a cluster command to set the state to online. The proxy resource may periodically poll the external resource or its cluster to determine its state, or it may invoke a command of the external cluster.

In one aspect of the invention, a cluster framework managing multiple resources may determine an ordering of the resources based on their dependencies. This may include creating a directed acyclic graph in which the resources are started in an order from the sink node(s) to the source node(s).

FIG. 1 illustrates one embodiment of an environment in which the invention might operate. However, not all of these components might be required to practice the invention, and variations in the arrangement and type of the components might be made without departing from the spirit or scope of the invention. As shown in the figure, system 100 includes client devices 102-103, network 120, and nodes 104-106. As shown, nodes 104-106 participate in cluster 101. In one embodiment, cluster 101 might be a high availability (HA) cluster, a high performance cluster, a load balanced cluster, or the like. Nodes 104-106 may be virtual nodes or physical nodes.

Generally, client devices 102-103 might include virtually any computing device capable of connecting to another computing device to send and receive information, including web requests for information from a server device, or the like. The set of such devices might include devices that typically connect using a wired communications medium such as personal computers, multiprocessor systems, microprocessor-based or programmable consumer electronics, network PCs, or the like. The set of such devices might also include devices that typically connect using a wireless communications medium such as cell phones, smart phones, radio frequency (RF) devices, infrared (IR) devices, integrated devices combining one or more of the preceding devices, or virtually any mobile device. Similarly, client devices 102-103 might be any device that is capable of connecting using a wired or wireless communication medium such as a PDA, POCKET PC, wearable computer, or any other device that is equipped to communicate over a wired and/or wireless communication medium.

Client devices 102-103 might further include a client application that is configured to manage various actions. Moreover, client devices 102-103 might also include a web browser application that is configured to enable an end-user to interact with other devices and applications over network 120.

Client devices 102-103 might communicate with network 120 employing a variety of network interfaces and associated communication protocols. Client devices 102-103 might, for example, use various dial-up mechanisms with a Serial Line IP (SLIP) protocol, Point-to-Point Protocol (PPP), any of a variety of Local Area Networks (LAN) including Ethernet, AppleTalk™, WiFi, Airport™, or the like. As such, client devices 102-103 might transfer data at a low transfer rate, with potentially high latencies. For example, client devices 102-103 might transfer data at about 14.4 to about 46 kbps, or potentially more. In another embodiment, client devices 102-103 might employ a higher-speed cable, Digital Subscriber Line (DSL) modem, Integrated Services Digital Network (ISDN) interface, ISDN terminal adapter, or the like.

Network 120 is configured to couple client devices 102-103, with other network devices, such as network device corresponding to nodes 104-106, or the like. Network 120 is enabled to employ any form of computer readable media for communicating information from one electronic device to another. In one embodiment, network 120 might include the Internet, and might include local area networks (LANs), wide area networks (WANs), direct connections, such as through a universal serial bus (USB) port, other forms of computer-readable media, or any combination thereof. On an interconnected set of LANs, including those based on differing architectures and protocols, a router might act as a link between LANs, to enable messages to be sent from one to another. Also, communication links within LANs typically include twisted wire pair or coaxial cable, while communication links between networks might utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 120 might further employ a plurality of wireless access technologies including, but not limited to, 2nd (2G), 3rd (3G) generation radio access for cellular systems, Wireless-LAN, Wireless Router (WR) mesh, or the like. Access technologies such as 2G, 3G, and future access networks might enable wide area coverage for network devices, such as client devices 102-103, or the like, with various degrees of mobility. For example, network 120 might enable a radio connection through a radio network access such as Global System for Mobil communication (GSM), General Packet Radio Services (GPRS), Enhanced Data GSM Environment (EDGE), Wideband Code Division Multiple Access (WCDMA), or the like.

Furthermore, remote computers and other related electronic devices could be remotely connected to either LANs or WANs via a modem and temporary telephone link. In essence, network 120 includes any communication method by which information might travel between one network device and another network device.

Additionally, network 120 might include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as, but not limited to, twisted pair, coaxial cable, fiber optics, wave guides, or other wired media and wireless media such as, but not limited to, acoustic, RF, infrared, or other wireless media.

As shown, cluster 101 includes nodes 104-106. Cluster 101 is a collection of nodes that operate together to provide various services. As shown, nodes 104-106 might communicate with each other. When cluster 101 is booted (e.g., the nodes of cluster 101 are initially started) and following any type of failure that takes a resource group offline (i.e., the resource group is no longer running on the node), at least one resource group is started on one or more available nodes to make at least one resource available to clients (e.g., client devices 102-103 over network 120).

Resources in resource groups might be dependent on resources in the same resource group or another resource group. Resource dependencies might include components (e.g., properties, associations) that describe the dependencies. For example, typical components might include the category of the dependency, the location of the dependency, the type of dependency, other qualifiers, or the like. Moreover, these components might be further defined with specific details (e.g., specific locations, types, or categories), which might add to the complexity of the dependencies. In one embodiment, clustering software uses an algorithm to satisfy all the dependencies when activating a particular resource group on a given node. If this is not possible, services of the resource group might remain offline.

Figure 2:
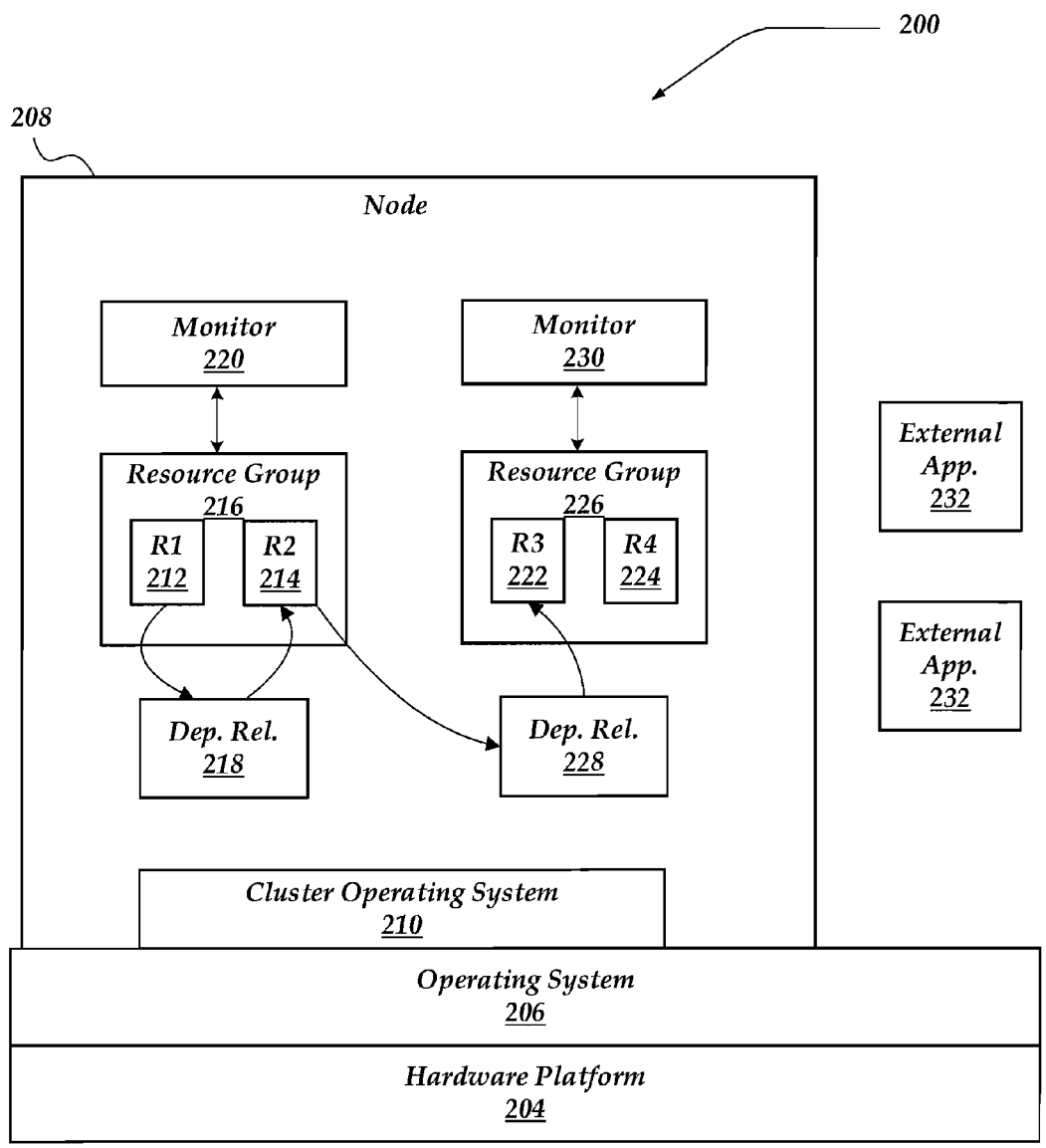
FIG. 2 shows a block diagram illustrating components of a cluster node in accordance with one embodiment of the invention.

FIG. 2 shows a system diagram of details of components of a cluster node in accordance with one embodiment of the invention. System 200, or a portion thereof, may correspond to any one of nodes 104-106 of FIG. 1.

Figure 9:
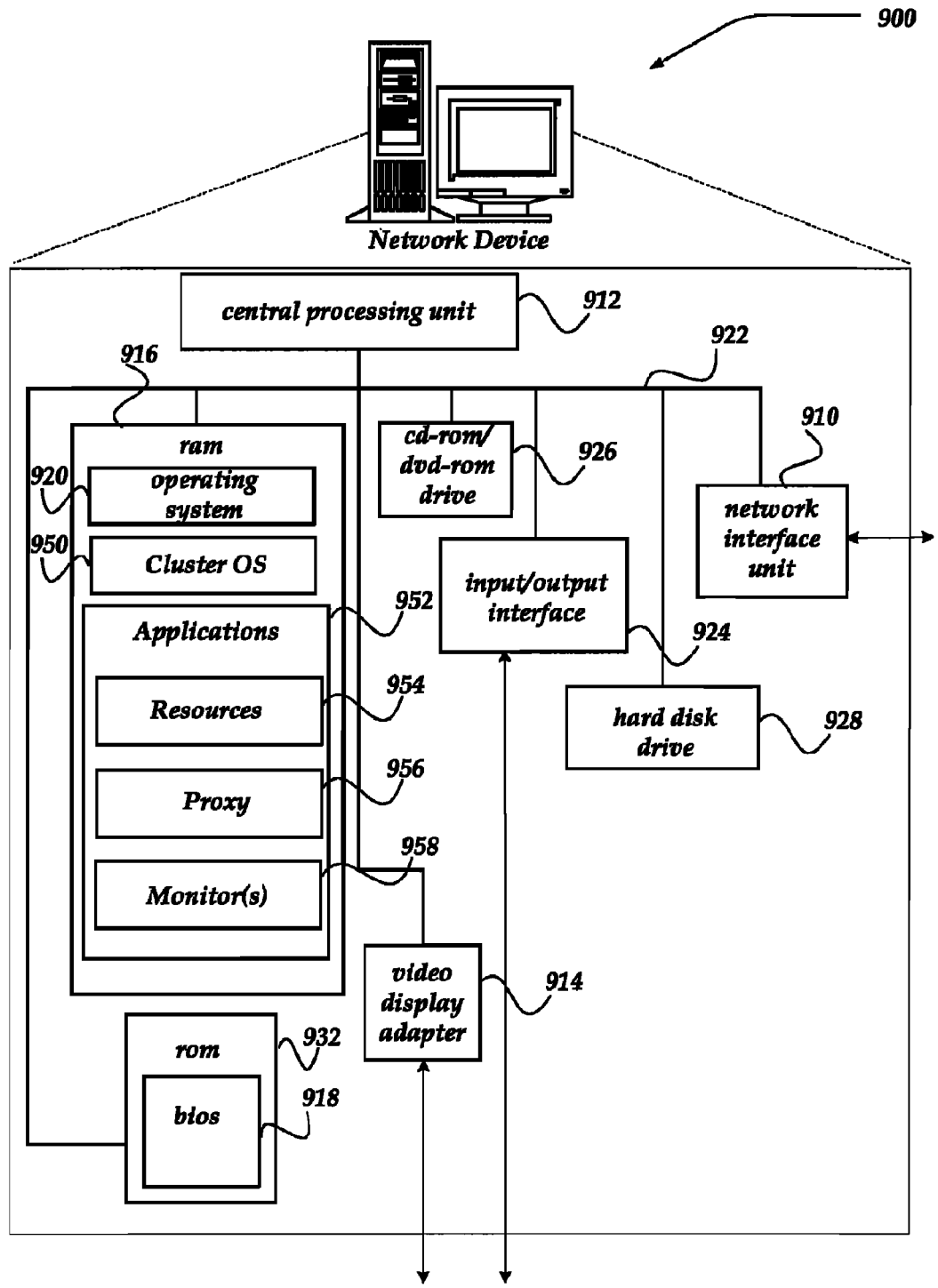
FIG. 9 illustrates one embodiment of a network device that may be used to manage resources in a cluster.

As shown, system 200 includes a hardware platform 204. Hardware platform may be the hardware of any type of computing device capable of connecting to another computing device to send and receive information. This may include a server, a personal computer, or other type of computing system. FIG. 9 illustrates a network device that may include the hardware platform 204 of system 200.

System 200 further includes an operating system 206. Operating system 206 may be any general purpose operating system, such as Unix, Linux, Windows, or the like. Operating system 206 may also be a special purpose operating system designed for particular functionality.

System 200 further includes a cluster operating system (OS) 210. In one embodiment, cluster OS 210 communicates with the hardware platform 204 through operating system 206, though in some embodiments cluster OS 210 may at least partially communicate with hardware platform 204 directly or through another intermediary component. Cluster OS 210 includes much of the logic of the cluster framework that maintains the availability of resources and services.

As shown, system 200 may have one or more resource groups that run on the node. For example, system 200 includes resource group 216, which includes resources R1 (212) and R2 (214), and resource group 226, which includes resources R3 (222) and R4 (224). A resource group may provide one or more services to users of the cluster.

Resource groups may also be associated with at least one monitor, such as monitor 220 to monitor the resources/resource groups. In one embodiment, a monitor may be a separate process that monitors the activity of the services provided by each resource. In one embodiment, a monitor may correspond to one resource, and there may be multiple monitors for each resource group. In one embodiment, a monitor may monitor multiple resources, such that a small number, or even one monitor, may monitor all of the resources of a resource group. As shown, monitor 220 represents one or more monitors, and monitors the resource group 216 and resources R1 212 and R2 214; monitor 230, which represents one or more monitors, monitors the resource group 226 and resources R3 222 and R4 224. A monitor may initiate a failover of its associated resource group in response to one of the services within the group failing, degrading, or becoming inaccessible. A monitor may inform a cluster framework that an event or status change has occurred, causing the cluster framework to take one or more resources offline, to place the resource online, or other control functions. In one embodiment, a cluster framework includes a system service that coordinates the starting, stopping, and monitoring of resource groups.

One or more dependency relationships may be associated with two resources on a node. The two resources corresponding to a dependency relationship may belong to the same resource group or to two different resource groups. As shown, relationship 218 declares a relationship for R1 212 and R2 214; relationship 228 declares a relationship for R2 214 and R3 222. For example, relationship 218 may specify that R1 212 is dependent on R2 214; relationship 228 may specify that R2 214 is dependent on R3 222. Though only two resources are illustrated in each of the resource groups 216 and 226, a resource group may have fewer or more resources, and zero or more relationships. A relationship may exist for any pair of resources. A node may have zero, one, or more resource groups.

In one embodiment, each of resource groups 216 and 226 might include one or more properties such as a nodelist (a list of nodes upon which the resource group may run), a resource group name, a resource group description, a "failover" policy (e.g., a policy that states whether to restart a resource group on a different node once the resource group has failed on the current node), or the like.

Resources such as those in resource groups 216 or 226 might be brought online or offline under varying circumstances. A resource group might be brought online when booting/starting servers in an associated cluster, when a user or a policy determines that a resource is to be started on a node, upon restarting of a resource, or the like. Resource groups might be brought offline when a user, policy, or program logic initiates restart, failover, or the like upon the resource group, or shuts down, an associated node or cluster.

In one embodiment, a particular monitor, such as monitor 220 or 230 might initiate a failover of its associated resource group when one of the services within the resource group fails or cannot make itself available to users. As shown, each resource and/or resource group might be associated with a monitor that might be a separate process that monitors the activity of the service(s) provided by the resource. When the resource group is activated on a node, a resource and a monitor for each resource in each resource group may also be activated. A failover is typically invoked if one of the monitors detects that the service provided by a particular resource (within the resource group) is unhealthy, has failed, or has hung, the service provided is showing performance degradation, or the like. In one embodiment, a monitor may request the cluster framework to initiate a fail-over. In order to restore the health of the service, the monitor might initiate a failover to restart the resource group on a different node. Thus, the failover might take a resource offline and then attempt to place the resource back online.

In one embodiment, one or more dependency relationships 218 or 228 might specify which resource is dependent on which other resource, when dependency relationships might be activated and what actions might take place if the relationships are activated (i.e., time based), and on which node the resource might be brought online or offline (i.e., locality based). Accordingly, a dependency relationship might have several characteristics (e.g., time based qualifiers, locality based qualifiers) that qualify the dependency relationship.

A dependency relationship 218 or 228 might indicate that a dependee is to be brought online (e.g., started or restarted) before a corresponding dependent. The dependent and the dependee might be in the same group or different groups. For example, upon booting of the cluster containing node 208, a dependent in resource group 216 might not start until a dependee in resource group 226 has started. Dependency relationships 218 or 228 might indicate that a dependee should not be brought offline until the dependent is brought offline. For example, the dependee resource R3 222 in resource group 226 should not be brought offline (e.g., stopped, restarted), until the dependent resource R2 214 in resource group 216 is brought offline. In one embodiment, the cluster framework maintains dependency relationships, and performs actions to facilitate the enforcement of dependency relationships.

In general, there might be several types of time based dependency relationships. These dependency relationships might include a Strong dependency, Weak dependency, Online Restart dependency, Offline Restart dependency, or the like. Strong dependency indicates that the dependent should not start until after the dependee starts. Weak dependency indicates that the dependent should wait until the dependee starts, but if the dependee fails to start, the dependent may start anyway. The two types of restart dependencies, in addition to following the strong dependency semantics, indicate additional actions that might be taken after both the dependent and dependee have been brought online and while both of their resource groups remain online. The online restart dependency indicates that the dependent might be restarted after the dependee has stopped and restarted for any reason, for example, due to a failover. The offline restart dependency indicates that the dependent might be stopped immediately whenever the dependee is stopped, and might be started after the dependee starts again.

As shown, system 200 includes two external applications 232. These applications are considered external in that they are not a component of the cluster, or do not conform to the conventions of a cluster component, though they may execute on the operating system 206 and on the hardware platform 204.

As used herein, the term "node" may refer to the cluster operating system and the set of resources, services, monitors, dependencies, and other cluster components that are collocated on a hardware platform. In system 200, the components illustrated within box 208 may be referred to as a cluster node. Thus, node 208 may be described as including cluster OS 210, resource groups 216 and 226, monitors 220 and 230, dependencies 218 and 228, and other components not illustrated. In some, but not all, uses, the term node may additionally include external applications executing on the same hardware platform as the node cluster, for example external applications 232. In some, but not all, uses, the term node may additionally include the operating system 206 and the hardware platform 204.

As used herein, the term "cluster framework" refers to the collection of cluster operating system, cluster tools, cluster data, and cluster components on all nodes of a cluster that are used to implement a cluster. A cluster framework may also include development tools or code libraries for use in developing applications or enabling applications to operate in a cluster. A cluster framework may include an API that contains method calls or other mechanisms for providing data or commands to the framework. In one embodiment, a cluster framework API may be invoked by a cluster resource to query or change a resource state. A cluster framework may include a resource manager component that performs actions, some of which are described herein, to manage one or more groups of resources.

In accordance with one aspect of the invention, a cluster framework may maintain status information for each external resource, including a current state of the external resource, as known by the cluster framework. In one embodiment, changes of state, or at least a portion thereof, involve communications between the cluster framework, a proxy, and the proxy's associated external resource or external resource framework. For example, a cluster framework may issue commands to the proxy, such as a start command or a stop command. In response to receiving one of these commands, the proxy may issue a corresponding start or stop command to the external service or its framework, in conformance with the latter's API. State changes may also occur as a result of the proxy receiving a notification of a state change for the external resource. In one implementation, a proxy may poll its associated external resource or framework for the current state and, if the current state is a change of state, the proxy may notify the cluster framework of the state change. Notification of the cluster framework may be performed by a function call, a message, a signal, or by other mechanisms. The term notification refers to any of these notification mechanisms, or other mechanisms, including synchronous or asynchronous mechanisms and active or passive mechanisms.

The node on which a resource group is online is considered the "master" of that resource group. A resource and/or a resource group might also be "multi-mastered" or "single mastered." A multi-mastered resource/resource group might have several instances of the resource/resource group run on several nodes. Whereas, a single mastered resource runs on a single node at a time.

Figure 3:
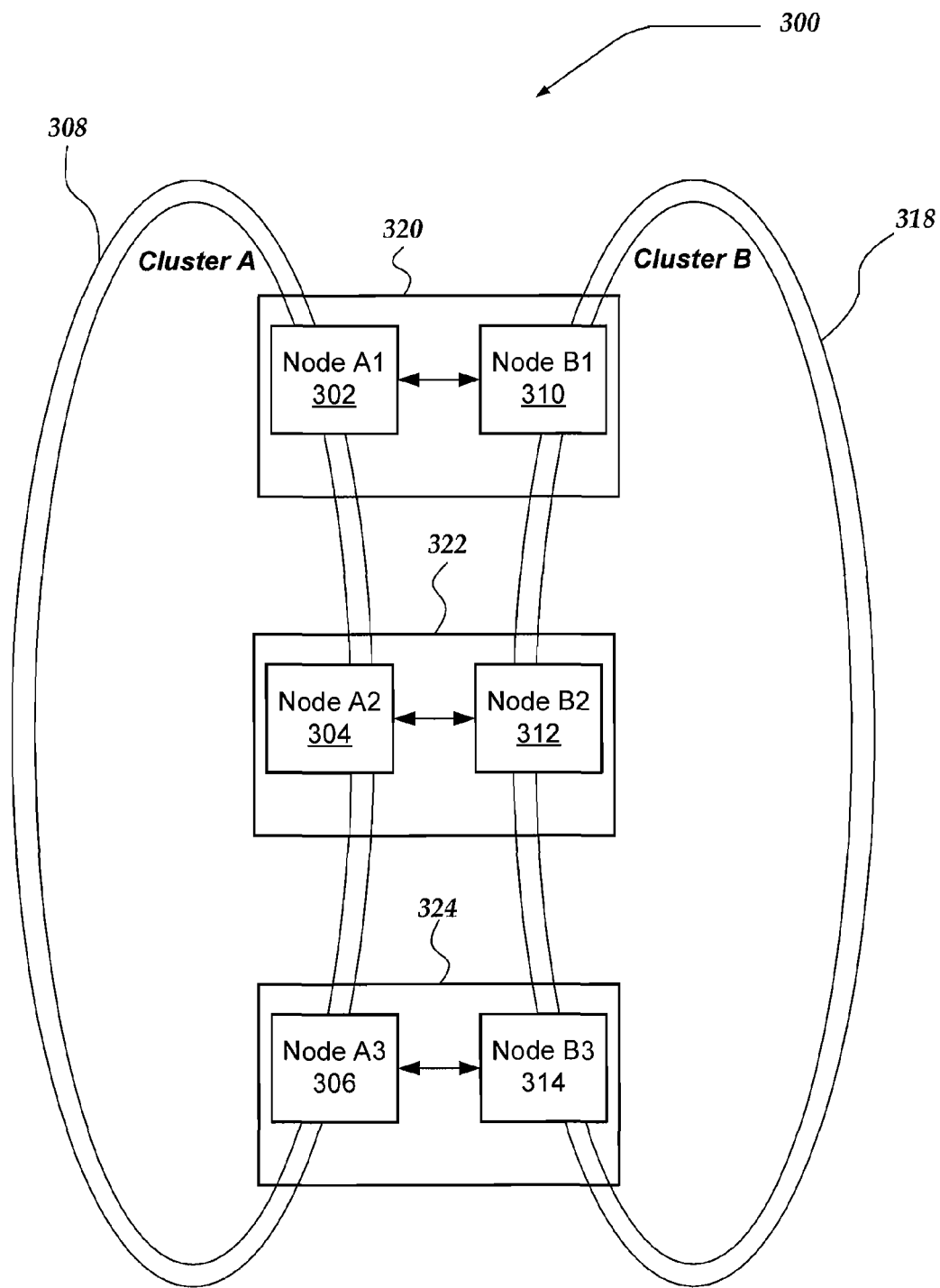
FIG. 3 illustrates one embodiment of an environment for practicing the invention.

FIG. 3 illustrates an embodiment of an environment in which the invention might operate. Though not shown in FIG. 3, system 300 may include client devices and a network, such as illustrated in FIG. 1 and discussed herein. As shown, node A1 302, node A2 304, and node A3 306 participate in cluster A 308, and node B1 310, node B2 312, and node B3 314 participate in cluster B 318. Nodes A1 302 and B1 310, of respective clusters A 308 and B 318 execute on platform 320. Nodes A2 304 and B2 312, of respective clusters A 308 and B 318 execute on platform 322. Nodes A3 306 and B3 314, of respective clusters A 308 and B 318 execute on platform 324.

Clusters may differ in their degree of integration with the platform on which they run. The Solaris Cluster™ is a clustering framework that is tightly integrated with its corresponding platform. The Oracle™ Real Application Cluster (RAC) is more loosely integrated with its corresponding platform. In one embodiment, a tightly integrated cluster, such as the Solaris Cluster™, may communicate with, and control aspects of, a more loosely integrated cluster, such as the Oracle™ RAC, executing on the same platform, such that nodes of each cluster are collocated on respective hardware platforms. A tightly integrated cluster may be referred to as a "native cluster."

Each of platforms 320-324 may include a hardware platform, such as hardware platform 204 of FIG. 2, and an operating system, such as OS 206. Cluster A 308 and cluster B 318 may be considered to be two collocated clusters sharing hardware and software platforms. It is to be noted that, while nodes 302-306 and nodes 310-314 are referred to as nodes, the combination of nodes 302 and 310 and the platform 320 may be referred to as a node. Thus, node 320, represents a node that is a combination of nodes 302 and 310, and the platform 320. Similarly, each of nodes 322 and 324 represent a combination of a corresponding platform and components contained therein.

Each node of cluster A 308 may communicate with a corresponding collocated node of cluster B 318. As shown in system 300, node 302 communicates with node 310, the communication represented by an arrow. Similarly, an arrow represents communication between node 304 and collocated node 312, and an arrow represents communication between node 306 and collocated node 314. Mechanisms employed in the inter-cluster communication are described in further detail herein.

Figure 4:
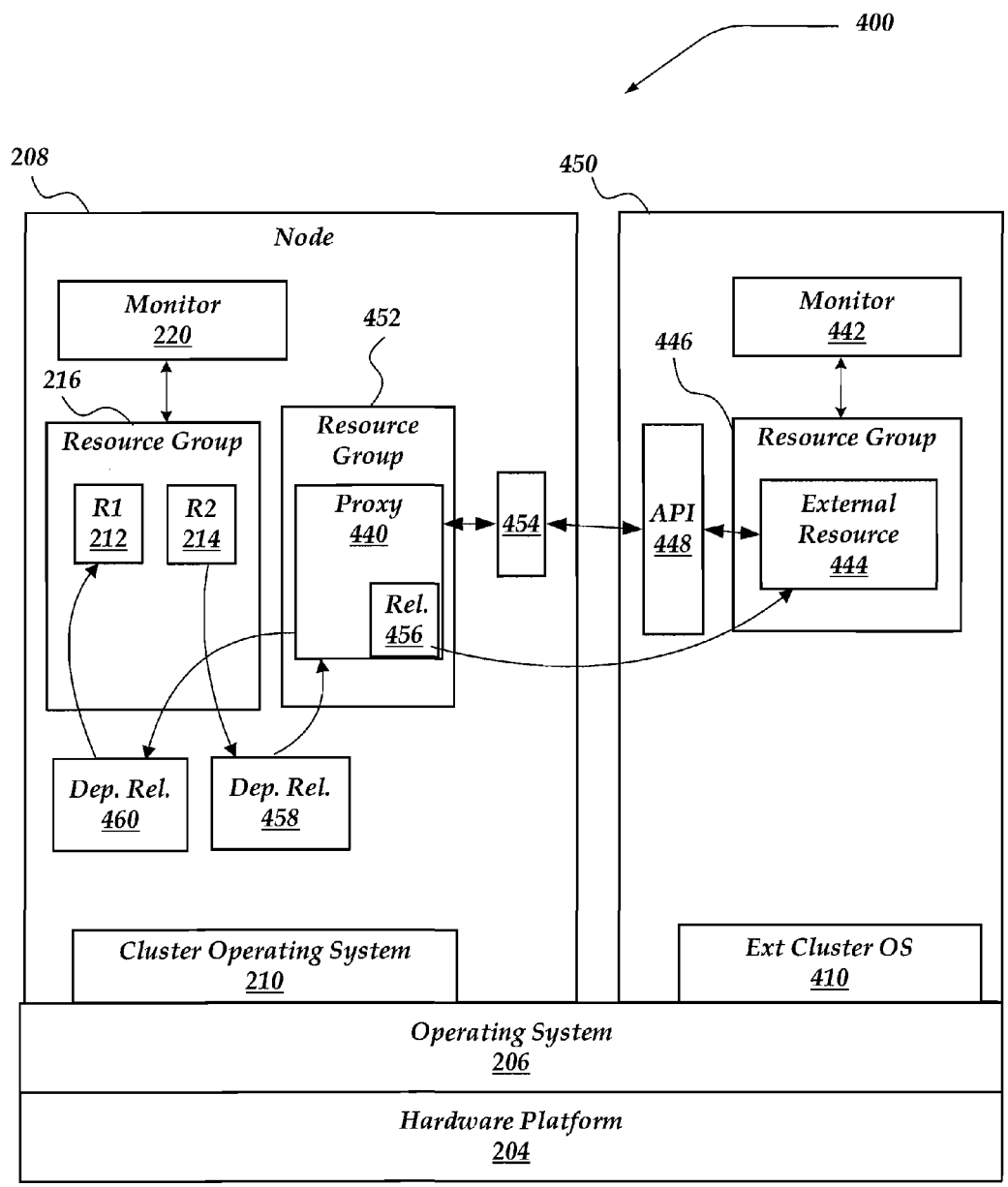
FIG. 4 shows a block diagram illustrating components of a cluster node in accordance with one embodiment of the invention.

FIG. 4 shows a system diagram of a system 400 in accordance with one embodiment of the invention. System 400 may correspond to any of nodes 320-324 of FIG. 3 or nodes 104-106 of FIG. 1. Elements of system 400 that are like numbered to those of system 200 of FIG. 2 have similar characteristics, and the discussion of these elements of system 200 may apply to system 400, unless stated otherwise herein. As shown, system 400 includes a cluster node 450 as an external application to cluster node 208. Referring to FIG. 3, cluster node 450 may correspond to any of cluster node 310, 312, or 314. Specifically, cluster node 450 includes an external resource group 446 containing an external resource 444. External resource 444 may be a resource or service that is external to the cluster controlled by cluster OS 210 and its cluster framework. In the illustrated embodiment, external resource 444 has a corresponding external resource monitor 442 that may perform actions with external resource 444 similar to those described for monitors 220 and 240. External resource 444 also has a corresponding external resource API 448 that enables components to communicate with and to control external resource 444.

One difficulty that may present itself in configurations such as shown in FIGS. 3 and 4, and other configurations, is that the API 448 exposed by external cluster node 450 may differ from mechanisms employed by cluster node 208. For example, external cluster node 450 may not adhere to a callback mechanism employed by cluster node 208, or other aspects may differ.

In accordance with one embodiment of the invention, a proxy component 440 may be employed to communicate with or to control external services, such as external resource 444, or other components of external cluster 450. Proxy component 440 may be a process that employs, or is controlled by, cluster operating system 210 of FIG. 2. Proxy component 440 may execute on the operating system 206 and the hardware platform 204.

In one embodiment, proxy component 440 has many of the features of resources R1 212 and R2 214, with respect to communication with, or control by, its corresponding cluster OS or monitor. Proxy component (also referred to simply as "proxy") may belong to a resource group, such as resource group 452. Though illustrated in its own resource group 452, proxy 440 may belong to resource group 216, or to another resource group having other resources. As discussed for other resource groups, proxy 440 may have an associated monitor performing the functions of a monitor as described herein, or other functions.

FIGS. 3 and 4 in combination illustrate that embodiments of the invention may include a configuration with two or more clusters having respective nodes that are collocated on respective node platforms, each node of one cluster communicating with or using services of a corresponding collocated node of another cluster. In accordance with one aspect of the invention, a proxy resource, such as proxy 440, may be created to facilitate communication with, and control of, an external process, such as external resource 444. The proxy may be employed to facilitate one or more dependency relationships with the external resource. For example, in the embodiment illustrated in FIG. 4, resource R2 214 may be dependent on the external resource 444. However, the API associated with external resource 444 or mechanisms associated with the external cluster or the external resource 444 may not fit into the dependency mechanisms of the cluster containing node 208 or the cluster OS 210. Also, control mechanisms employed by an external cluster framework may perform actions, such as starting and stopping resources, that are outside of the control of the cluster of node 208. In accordance with one aspect of the invention, a dependency relationship with the proxy 440 may be created to serve as a proxy for a desired relationship with the external resource. The proxy may maintain data representative of a proxy relationship 456 between itself and the external resource. The proxy may perform actions, or have an agent perform actions, to enforce this relationship. Thus, at least a portion of the handling of the external relationship is performed outside of the normal mechanisms of the cluster framework. As illustrated in the embodiment of FIG. 4, a dependency relationship 458 between the resource R2 214 and the proxy 440, together with the proxy relationship 456 between the proxy 440 and the external resource 444 serve to implement a desired, or virtual, dependency relationship between the resource R2 214 and the external resource 444. Thus, one aspect of the invention includes creating dependency relationships with a proxy that corresponds to desired relationships with an external application. Though one dependency relationship 458 is illustrated, a proxy may have zero, one, or more such proxy relationships.

In a similar manner, a resource, such as R2 214, that desires to communicate with, or control, an external resource, such as external resource 444, may employ a proxy 440 as an intermediary. The proxy 440 communicates with the resource R2 214 using communication mechanisms of the cluster. It also communicates with and controls the external resource 444 using the API 448 of the external resource, or the external cluster. In one embodiment, a daemon process is invoked to serve as a helper process 454. In one embodiment, a helper process may be located on node 450 and be controlled by the external cluster framework.

In one embodiment, a cluster framework may use a callback mechanism to communicate with or control services of the cluster. A service may register one or more callback functions that are invoked when a status change occurs, or when a status change is desired. Status changes may include initialization, shutdown, or the like. A callback function may also be invoked in order to receive a current status of a service. An external resource, such as external resource 444 may have an API 448 that does not conform to the callback mechanism of the cluster framework. In one embodiment, proxy 440, or its helper process 454, may register one or more callback functions with the cluster framework, and receive a subsequent invocation of these functions. Upon invocation of the callback function, the proxy or helper process may communicate with the external resource 444 by using a corresponding component of the API 448 associated with the external resource. In one embodiment, the external API 448 may itself include a callback mechanism, which may differ from the callback mechanism of the cluster framework, or require intermediate processing. The proxy 440 or its helper process 454 may therefore receive invocations of its callback functions and invoke callback functions of the external resource 444.

In one embodiment, at least a portion of the external API 448 may be used to communicate with the external cluster framework. For example, the proxy 440 or its helper process 454 may use the external API 448 to communicate with the external cluster OS 410 instead of, or in addition to, communicating directly with the external resource 444.

Figure 5:
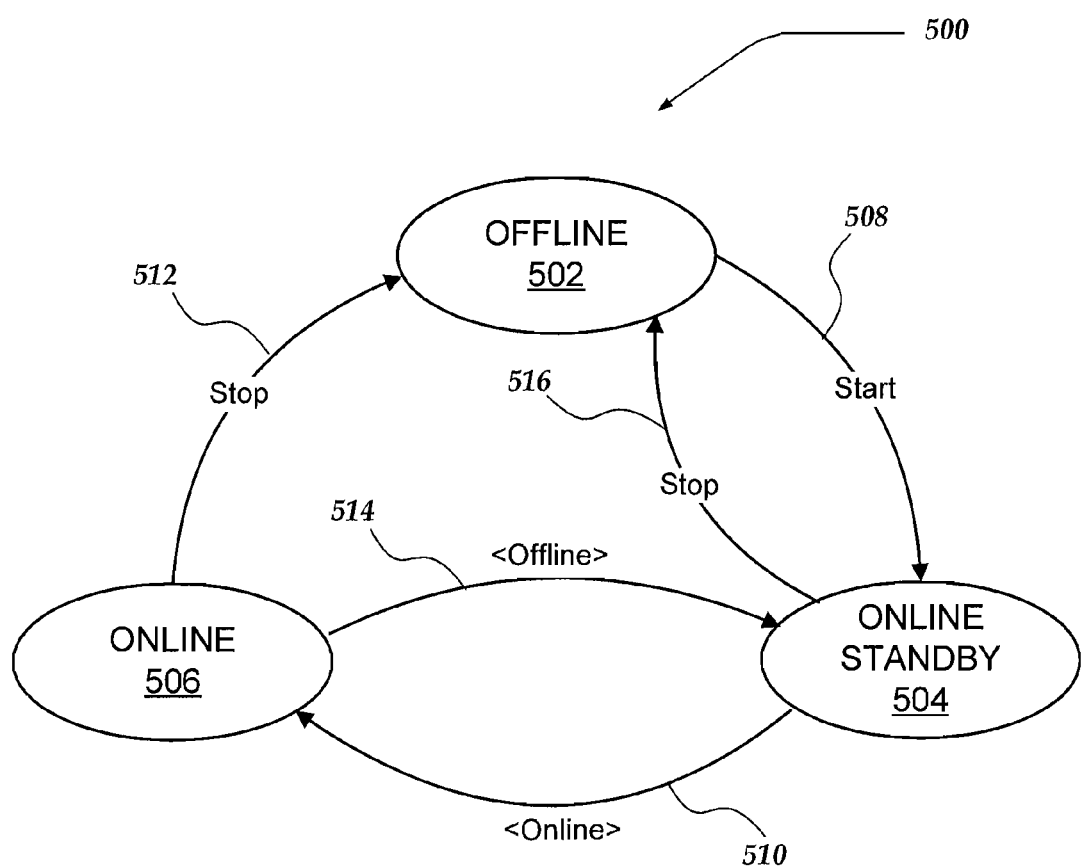
FIG. 5 illustrates a state machine that may be employed, in accordance with one embodiment of the invention.

FIG. 5 illustrates a state machine 500 having three states of a proxy resource, and transitions between states that may be employed in accordance with one embodiment of the invention. It is to be noted that each state in FIG. 5 and discussed herein represents a state of a proxy as known by the cluster framework. This may differ from a state of the external resource corresponding to the proxy, as known by an external resource or its framework. For example, an external resource may terminate, but a period of time may pass in which the cluster framework maintains data that the proxy resource is online. Thus, discussions of proxy resource status should consider states from this perspective.

As illustrated in FIG. 5, an "offline" state 502 indicates that the proxy resource has not been started, or has not been enabled. This may be the state of a proxy resource prior to invocation by the cluster framework. A cluster framework may issue a "start" command to a proxy, instructing the proxy to start the associated external resource or communicate with the external resource or its framework to determine the state of the external resource. In response to an invocation, the proxy may return a status of success, indicating that it has been successfully started.

If the proxy returns an indication of success to the cluster framework, the state of the proxy resource transitions to an "online-standby" state 504. Though not illustrated, an indication of failure may result in no state transition or a transition to an error state. The "start" transition is indicated by the start transition arrow 508.

A state of "online standby" 504 indicates that the proxy has at least begun a startup or initialization action, but it does not necessarily indicate that its associated external resource is enabled for use by the cluster applications. As discussed below, in one implementation, the state of online-standby is a state that is internal to the cluster framework, and is not provided to resources or applications that may query the current state of the proxy. From the view of resources or applications, and from an API or administrative interfaces, the proxy resource continues to appear as offline when the proxy is in the online-standby state.

In response to invocation by the cluster framework, the proxy may query the external resource or the external cluster framework for its status. In one embodiment, the proxy may issue a command to the external cluster framework to start the external resource.

A proxy may receive a notification of online status from the external resource or its framework, during a state of "online standby" 504. In response to receiving this notification, the proxy may notify the cluster framework of this state change. In response to the latter notification, the cluster framework may change the proxy resource state to an "online" state 506. An "online" state 506 indicates that the external resource is enabled to perform as a service or resource to the cluster or its applications. The "online notification" transition is indicated by the online notification transition arrow 510.

When a proxy resource is in an "online" state 506, an administrator may issue a command to stop the proxy. The cluster framework may send a "stop" command to the proxy to transition the proxy state to offline state 502. The "stop command" transition is indicated by the stop command transition arrow 512. In one implementation, in response to receiving a stop command, the proxy may initiate a command or other action to stop the associated external resource.

As illustrated in FIG. 5, a "stop" command may be issued when the proxy resource is in an "online standby" state 504. In response to a stop command, a "stop command" transition 516 may occur, resulting in a change to the "offline" state 502. In one implementation, an "offline notification" transition 514 may occur as a result of an offline notification received when the proxy resource is in an "online state" 506. This may occur, for example, as a result of the associated external resource failing. This causes a transition to the "online standby" state 504. In this state, the proxy resource may continue to monitor the external resource to determine when it becomes enabled, as discussed above. Other transitions or states may also be used, or modifications of the ones describe herein may be employed, in accordance with embodiments of the invention.

Figure 6:
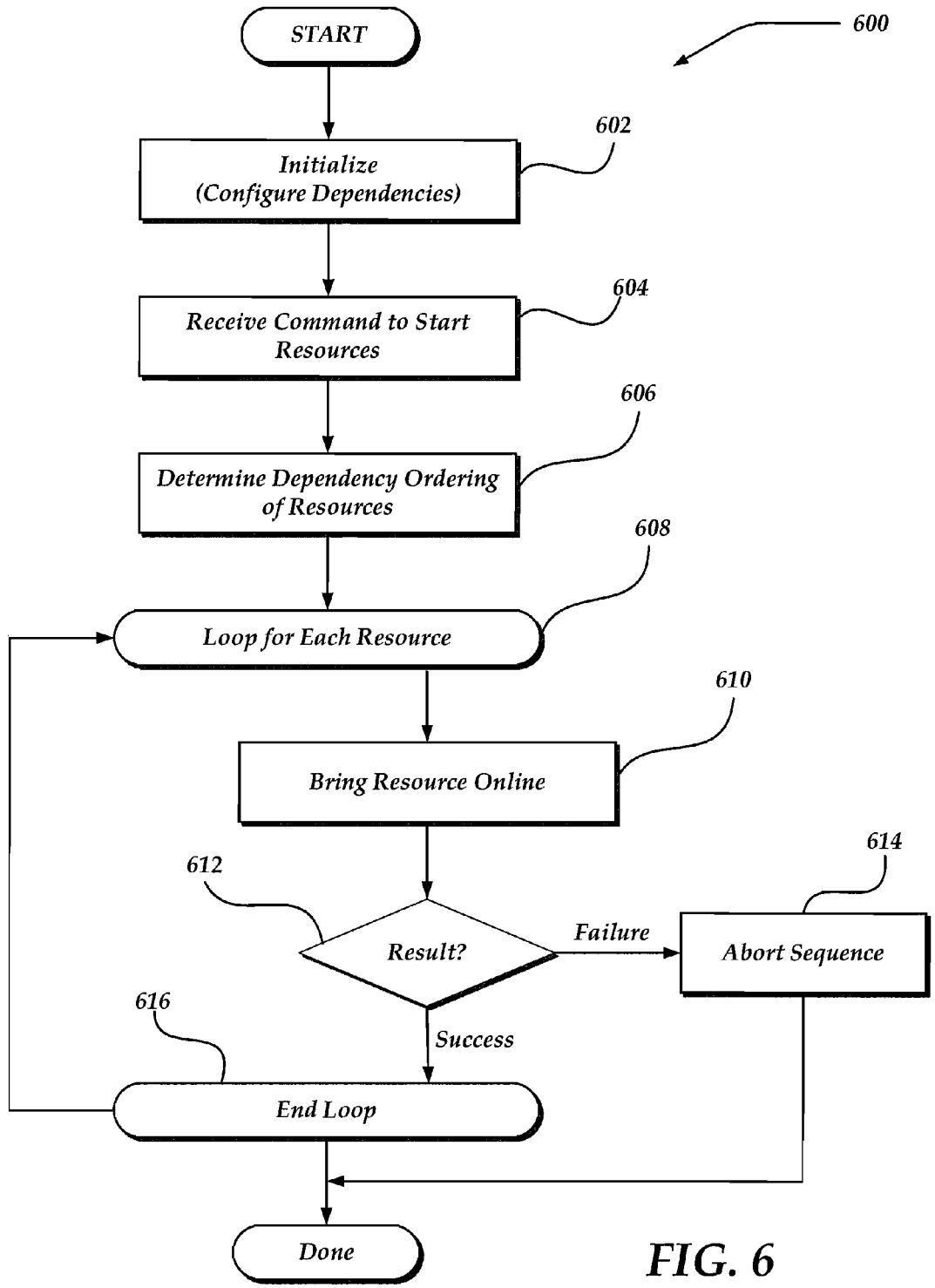
FIG. 6 is a flow diagram illustrating a process for managing resources in a cluster, in accordance with one embodiment of the invention.

FIG. 6 illustrates a logical flow diagram generally showing one embodiment of a process 600 for managing resources in a cluster and for bringing resources online. Process 600 of FIG. 6 might be implemented, for example, within nodes 104-106 of FIG. 1, or node 208 of FIG. 2.

Process 600 begins, after a start block, at block 602, where initialization of the system is performed. Initialization may include determining dependencies among resources of the system, and configuring the system to specify the determined dependencies. Dependency specifications may be stored in a dependency or configuration repository within the cluster framework on any one or more nodes of the cluster. Initialization may also include creation of one or more proxy resources corresponding to external resources. Creation of a proxy resource may include generating or linking program instructions, data, or other program components.

The process 600 may flow to block 604, where a command is received to bring resources online. The command may be received, for example, by the cluster framework as part of a procedure of booting the cluster or a portion thereof. The command may also be received from other components within the cluster or external to it.

The process may flow to block 606, where dependency specifications are used to determine an ordering of resources. This action may include creating a directed acyclic graph of the resource dependencies, the graph including one or more sink nodes that are dependee resources and are not dependent on another resource. In one implementation, at least a portion of this action is performed as part of the initialization at block 602.

The process may flow to block 608, where a loop is iterated for each resource in an order based on the dependency specifications. More specifically, an ordering may have sink nodes of a graph, which are not dependent on any other resource at the beginning of an ordering, such that for any dependent resource, all descendent dependee resources are ordered prior to the resource. For example, in the system 400 of FIG. 4, an ordering sequence might be resource R1 212, proxy 440, resource R2 214, where proxy 440 is dependent on resource R1 212, and resource R2 214 is dependent on proxy 440.

Within the loop 608, the process may flow to block 610, where the next resource is brought online. The first time through the loop 608, the next resource is the first resource of the sequence. The actions of block 610, bringing a resource online, are illustrated in more detail in FIG. 7 and the accompanying discussion. Briefly, the actions may include distinguishing a proxy resource from a non-proxy resource, and performing different actions for each. For a proxy resource, the actions may include use of a state machine having states of offline, online standby, and online, and setting a status in each of these states. Bringing a proxy resource online may be performed asynchronously, where the cluster framework waits for a command or other indication that the desired resource is online.

The process may flow to block 612, where a determination is made of the result of bringing the resource online. If the attempt to bring the resource online failed, the process may flow to block 614, where failure actions are performed. In one embodiment, this may include aborting the sequence of bringing multiple resources online, and the loop 610 may exit. In one embodiment, failure actions may include shutting down one or more resources that have been started as part of the loop 610. In one embodiment, failure actions may include reiterating the loop 610 with the same resource, and performing one or more additional attempts to bring the resource online. In one embodiment, failure actions may include moving one or more resources to another node of the cluster. After performing the failure actions of block 614, the process 600 may return to a calling program.

If, at block 612, it is determined that the resource was successfully brought online, the process may flow to block 616, which represents the end of loop 610. If additional resources remain to be brought online, loop 610 may iterate with the next resource of the sequence.

Figure 7:
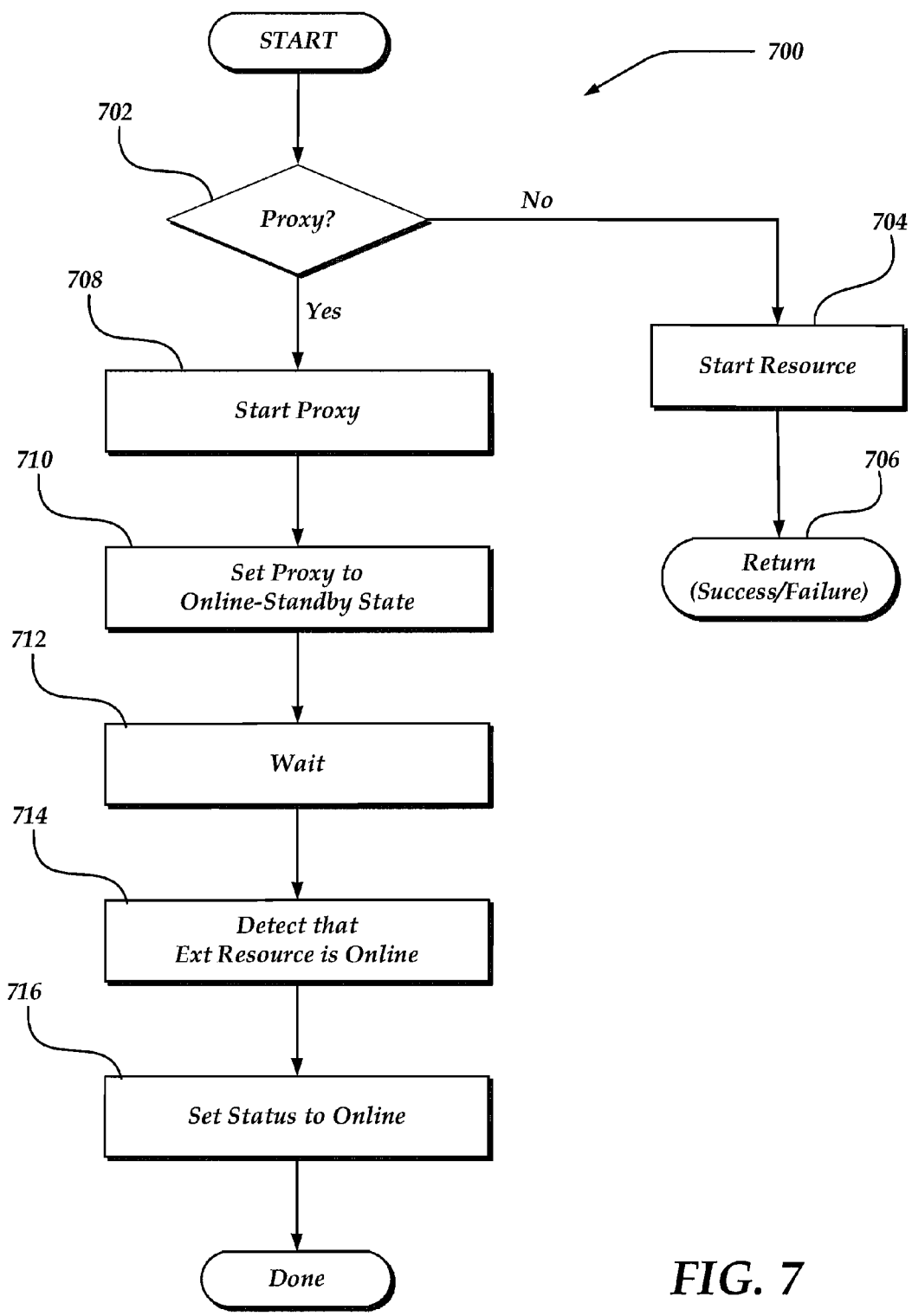
FIG. 7 is a flow diagram illustrating a process for bringing resources online, in accordance with one embodiment of the invention.

It is to be noted that, as discussed above and in more detail in FIG. 7, a proxy resource may have one or more intermediate states prior to successfully bringing the resource online. The intermediate states are represented in FIG. 7, and at the abstraction of FIG. 6, only the final results of success or failure are represented. As discussed herein, bringing a proxy resource online may include an asynchronous series of steps, and may allow other actions to be performed concurrently. For example, while waiting for a final result, the loop 610 may continue to bring one or more other resources not dependent on the current resource online, or the cluster framework may perform other actions. However, for ease of illustration, the process 600 is shown as a sequential process.

After iterating the loop 610 over each resource to be brought online, the process 600 may return to a calling program to perform additional actions.

FIG. 7 illustrates another logical flow diagram generally showing one embodiment of a process 700 for bringing a resource online. Process 700 may be performed as all or a portion of the actions of block 610 of FIG. 6. In one configuration, at the beginning of process 700, the state of the proxy resource may be offline, for example offline state 502 of FIG. 5

Process 700 begins, after a start block, at block 702, where a determination is made of whether the resource to be brought online is a proxy resource. In one embodiment, a proxy resource has one or more characteristics, such as an attribute or class membership, that provides an indication that it is a proxy resource. The process 700 may employ this characteristic to make this determination. In one implementation, the action of determining whether a resource is a proxy may be made after starting the resource, at block 704, for example, by invoking a method or examining an attribute of the executing resource.

If the resource is not a proxy resource, process 700 may flow to block 704, where the resource is started. The resource may be a part of the current cluster, and may be started using mechanisms of the cluster framework. At a block 706, the process may return to a calling program with a status of success or failure. If the resource has been started successfully, this action may include setting a status of the resource to online. In one embodiment, a calling program may set this status. If the resource was not started successfully, the action of block 706 may include setting a status of the resource to offline, or leaving the status unchanged if it was already offline.

If, at block 702, it is determined that the resource is a proxy resource, the process may flow to block 708, where actions to bring the proxy resource online are performed. At block 708, actions to start the proxy resource may be performed. In one implementation, this may include invoking a start method of the proxy. In one implementation, a proxy start method starts a proxy daemon that performs proxy actions as discussed herein. Though not illustrated, a failure to start the proxy may cause the process 700 to abort, leaving the associated proxy status in a state of offline, or setting it to offline.

The process may flow to block 710, where the status of the resource is set to online-standby, for example online-standby state 504 of FIG. 5. This state indicates that a proxy has been successfully started, but the associated external resource is not yet enabled or available for use by other resources. In one implementation, the state of online-standby is a state that is internal to the cluster framework, and is not provided to resources or applications that may query the current state of the proxy. From the view of resources or applications, and from an API or administrative interfaces, the proxy resource continues to appear as offline when the proxy is in the online-standby state. Presentation of an offline state in interfaces facilitates compliance with dependencies, for example, by restricting initialization or use of resources that may be dependent on the proxy.

At block 712, the process, or a portion thereof, may wait for an event to occur, indicating a status change of the proxy resource. In various implementations, waiting may include performing other actions, blocking a thread, performing polling actions, returning to a calling program and performing additional actions of process 700 in response to a signal, or other such ways of implementing a wait state.

At block 714 the proxy may determine that the external resource is enabled and available to be used by other resources or applications. The actions of block 714 may include the proxy performing actions to make this determination. In one implementation, the proxy may periodically poll an external cluster that controls the external resource for a status of the external resource. In one implementation, the proxy may invoke a command of the external cluster that facilitates determining the external resource status. In various implementations, the proxy may receive a signal or other notification, employ portions of the external cluster API, or detect a system change that indicates a status of the external resource. In any case, in response to determining that the proxy has become enabled or available, the process may flow to block 716.

At block 716, the status of the proxy resource is set to online. In one implementation, this action may include the proxy invoking a cluster framework method to change the state to online, for example online state 506 of FIG. 5. In various implementations, this action may include the proxy setting or storing status data, sending a signal, or performing other actions to indicate an online status.

Though not illustrated in FIG. 7, the proxy may determine that the status of the resource is to be set to offline, for example in response to receiving an administrative command to stop the proxy. In response, the status of the resource may be set to offline, such as offline state 502 of FIG. 5. In one embodiment, the proxy may invoke a cluster framework method to change the state of the proxy to offline. In one implementation, in response to determining that the external resource is disabled, the proxy may cause the proxy state to be online-standby. It may then poll or otherwise wait for a change in state to set its state to online. In response to the external resource being disabled, and the proxy state changing to online-standby, or the proxy being stopped and changing to offline, the cluster framework may disable any resources that are dependent on the proxy.

The process 700 may then return to a calling program, where additional actions may be performed.

Figure 8:
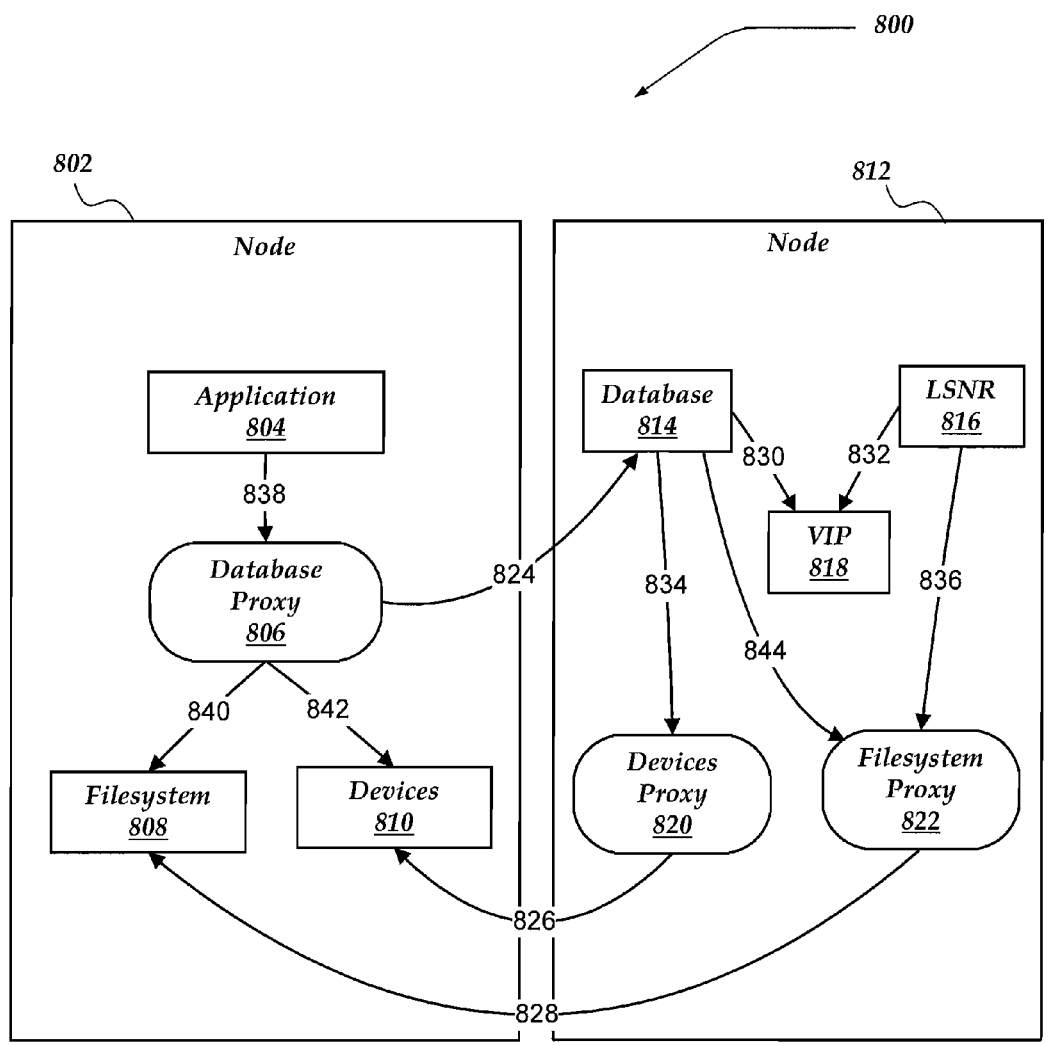
FIG. 8 illustrates a system configuration that may employ an embodiment of the invention.

FIG. 8 illustrates a system configuration 800 in accordance with an embodiment of the invention. In FIG. 8, nodes of two clustering frameworks are collocated on a single physical node. Node 802 belongs to a first cluster, which is referred to in this discussion as the native cluster. Node 812 belongs to a second cluster, which is referred to as the external cluster. In one configuration, the native cluster is a version of Solaris Cluster™, and the external cluster is a database cluster, such as Oracle CRS™. Nodes 802 and 812 are referred to, respectively, as the native node 802 and the external node 812, both nodes being collocated on a common hardware platform.

In the illustrated embodiment, the external node 812 includes three resources that are managed by the external clustering framework: database 814, a listener resource (LSNR) 816, and a virtual IP address (VIP) 818.

In the illustrated embodiment, the native node 802 includes three resources that are managed by the native clustering framework: application 804, file system 808, and devices 810. Application 804 may be any software application that uses or depends on database 814. File system 808 represents a file system on which persistent data is stored by database 814. Devices 810 represent one or more physical disk or other storage devices on which persistent data is stored by database 814.

To establish dependencies between resources in node 802 and node 812, proxy resources are used. Specifically, database proxy 806, in node 802 is a proxy for database resource 814 of node 812, as indicated by arrow 824; devices proxy 820, in node 812 is a proxy for devices resource 810 of node 802, as indicated by arrow 826; and file system proxy 822 in node 812 is a proxy for file system resource 808 of node 802, as indicated by arrow 828. Thus, arrows 824, 826, and 828 represent proxy relationships.

Arrows 830-842 represent dependency relationships. Specifically, database 814 is dependent on VIP 818, as represented by arrow 830. LSNR 816 is dependent on VIP 818, as represented by arrow 832. Database 814 is dependent on devices proxy 820, as represented by arrow 834. Thus, the dependency of database 814 on devices proxy 820, together with the proxy relationship of devices proxy 820 with devices resource 810 serve to implement a virtual dependency of database 814 on devices resource 810. Database 814 is also dependent on filesystem proxy 822, as represented by arrow 844. The dependency of database 814 on filesystem proxy 822, together with the proxy relationship of filesystem proxy 822 with filesystem resource 808, implements a virtual dependency of database 814 on filesystem resource 808. Similarly, LSNR 816 has a virtual dependency on file system

808. Application 804 is dependent (as shown by arrow 838) on database proxy 806, which has a proxy relationship (arrow 824) with database 814, implementing a virtual dependency of application 804 on database 814. Devices proxy 820 and filesystem proxy 822, may execute on, and be part of, the external cluster 812. They may each be referred to as an external proxy. Each may employ all or a portion of the mechanisms of proxies, as described herein.

As further illustrated, arrow 840 indicates that database proxy 806 is dependent on file system 808, and arrow 842 indicates that database proxy 806 is dependent on devices 810. In one implementation, dependency configurations may be stored by the cluster framework of the dependent resource. For example, the native cluster framework, corresponding to node 802, may store the dependencies of application 804 and database proxy 806. In one implementation, a proxy may store its own dependencies. For example, devices proxy 820 and file system proxy 822 may store their respective dependencies. Two collocated cluster frameworks may employ different techniques for storing and applying their respective resource dependencies.

In one embodiment, the native clustering framework directly controls starting and stopping of the resources within the native node 802, and the external clustering framework directly controls starting and stopping of the resources within the external node 812. If a resource needs to be started or stopped, it is started or stopped by the clustering framework that controls it.

In the system illustrated by FIG. 8, when the native node 802 and the external node 812 are booted up, each clustering framework performs actions to start up the configured services on its respective node. As discussed herein, services upon which other services have a dependency are started first. In system 800, the native clustering framework starts file system 808 and devices 810, which do not depend on another resource and are therefore lowest in a dependency graph. The external clustering framework starts VIP 818.

The external clustering framework may also start devices proxy 820 and file system proxy 822, and does not necessarily wait until file system 808 and devices 810 have been started. In one implementation, each of devices proxy 820 and file system proxy 822, upon starting, polls the native clustering framework to determine whether their respective resources, devices 810 and file system 808 have been started and are online. Each proxy may wait for an affirmative response prior to returning a success status. Thus, in one implementation, the external cluster may employ an offline and online state without an intermediate online-standby state.

Following a successful start of devices proxy 820 and VIP 818, the external clustering framework may start database 814. Thus, the virtual dependency of database 814 on devices 810 has been enforced. Following a successful start of file system proxy 822 and VIP 818, LSNR 816 may be started. Thus, the virtual dependency of LSNR on file system 808 has been enforced.

Following a start of file system 808 and devices 810, the native clustering framework may start database proxy 806. As discussed elsewhere herein, the starting of database proxy 806 may be done asynchronously with its corresponding database resource 814. The native clustering framework may start database proxy 806 and receive a success status. In response, the status of the database proxy is set to online-standby. As discussed herein, in one implementation, online-standby is a state internal to the native clustering framework. Application 804 may see a status of offline for the database proxy 806 when it is considered to be online-standby by the native cluster framework.

At a later time, the database proxy detects that its corresponding resource, database 814, has been started and is enabled. Mechanisms such as polling, executing external cluster commands, or other mechanisms may be used to detect this. In response, database proxy 806 may perform actions to set its state to online. In one implementation, these actions may include invoking a native clustering framework method to move the state of the database proxy 806 from online-standby to online. When the database proxy 806 is online, it appears available by application 804. Application 804 may then be started, for example by executing its own start method. If successful, application 804 will become online.

As illustrated by FIG. 8, one aspect of the invention includes creating a dependency relationship with a proxy that corresponds to a desired relationship wherein an external resource is dependent on a cluster resource. The dependency relationships 838 and 834, together with proxy relationships 824 and 826, illustrate a situation in which a cluster resource (application 804) is dependent upon an external resource (database 814), which in turn is dependent upon another cluster resource (devices 810). Thus, dependencies may be interleaved between two collocated clusters. Similarly, dependency relationships 838 and 844, together with proxy relationships 824 and 828 illustrate another pair of interleaved dependency relationships.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor, provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

Illustrative Network Device

FIG. 9 shows a network device, according to one embodiment of the invention. Network device 900 might include many more or less components than those shown. The components shown, however, are sufficient to disclose an illustrative embodiment for practicing one or more embodiments of the invention. Network device 900 might represent, for example, nodes 104-106 of FIG. 1, system 200 of FIG. 2, nodes 320-324 of FIG. 3, or system 400 of FIG. 4.

Network device 900 includes processing unit 912, video display adapter 914, and a mass memory, all in communication with each other via bus 922. The mass memory generally includes RAM 916, ROM 932, and one or more permanent mass storage devices, such as hard disk drive 928, tape drive, optical drive, and/or floppy disk drive. The mass memory stores operating system 920 for controlling the operation of network device 900. The mass memory also stores cluster operating system 950. Cluster operating system 950 may be tightly integrated with operating system 920, or more loosely integrated. In one embodiment, network device 900 may include more than one cluster operating system, each corresponding to a cluster framework, and each controlling resources associated with its cluster framework. Network device 900 also includes applications 952, which might be expressed as one or more executable instructions stored at one or more locations within RAM 916, although the instructions could be stored elsewhere. Applications 952 may include resources 954, one or more proxy resources 956, monitor(s) 958, and associated supporting applications. Applications 952 may include additional applications that are managed by the cluster framework or that use the cluster framework.

As illustrated in FIG. 9, network device 900 also can communicate with the Internet, or some other communications network via network interface unit 910, which is constructed for use with various communication protocols including the TCP/IP protocol. Network interface unit 910 is sometimes known as a transceiver, transceiving device, or network interface card (NIC).

The mass memory 916, 926, 928, 932 described herein and shown in FIG. 9 illustrates another type of computer-readable media, namely computer storage media. Computer storage media might include volatile, nonvolatile, removable, and non-removable media implemented in any method or technology for storage of information, such as computer readable instructions, data structures, program modules, or other data, which might be obtained and/or executed by CPU 912 to perform one or more portions of processes 600 and 700 shown in FIGS. 6 and 7, respectively, for example. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory might also store other types of program code and data as applications 952, which might be are loaded into mass memory and run on operating system 920. Examples of application 950 might include email client/server programs, routing programs, schedulers, calendars, database programs, word processing programs, HTTP programs, RTSP programs, traffic management programs, security programs, and any other type of application program.

Network device 900 might also include an SMTP handler application for transmitting and receiving e-mail, an HTTP handler application for receiving and handing HTTP requests, a RTSP handler application for receiving and handing RTSP requests, and an HTTPS handler application for handling secure connections. The HTTPS handler application might initiate communication with an external application in a secure fashion. Moreover, network device 900 might further include applications that support virtually any secure connection, including TLS, TTLS, EAP, SSL, IPSec, or the like.

Network device 900 might also include input/output interface 924 for communicating with external devices, such as a mouse, keyboard, scanner, or other input/output devices not shown in FIG. 9. Likewise, network device 900 might further include additional mass storage facilities such as CD-ROM/DVD-ROM drive 926 and hard disk drive 928. Hard disk drive 928 might be utilized to store, among other things, application programs, databases, or the like in the same manner as the other mass memory components described above.

What is claimed as new and desired to be protected by Letters Patent of the United States is:

1. A method for managing resources in a cluster, comprising:

creating a proxy resource, wherein the proxy resource is associated with an external resource, wherein the proxy resource is configured to communicate with the external resource, wherein the external resource is located in an external cluster, wherein the external cluster executes on a hardware platform;

making a determination that a resource in the cluster is dependent on the external resource, wherein the cluster executes a cluster framework and wherein the proxy resource is located in the cluster;

based on the determination, creating a first dependency between the resource and the proxy resource and creating a second dependency between the proxy resource and the external resource;

starting, by the cluster framework, the proxy resource;

configuring in response to the starting of the proxy resource, by the cluster framework, a state of the proxy resource to indicate that the proxy resource is in an online-standby state and a state of the external resource to indicate that the external resource is not enabled;

determining an ordering to enable a set of resources including the resource and the external resource, wherein the ordering is based on dependencies of the set of resources and interleaves resources controlled by the cluster framework and the external resource;

enabling the set of resources by enforcing at least the first dependency;

receiving, by the proxy resource, information indicating that the external resource is enabled;

reconfiguring, in response to receiving information that the external resource is enabled, the state of the proxy resource to indicate that the proxy resource is online;

invoking, in response to receiving the information, a cluster command to reconfigure the state for the external resource to indicate that the external resource is enabled;

reconfiguring, in response to the cluster command, the state of the external resource to indicate that the external resource is enabled; and starting, by the cluster framework, the resource in response to the determination that the state of the proxy resource indicates that the proxy resource is online and based on the first dependency and the second dependency, wherein the resource is configured to execute an instruction after the resource is started.

2. The method of claim 1, wherein receiving the information indicating that the external resource is enabled comprises periodically performing a query to determine if the external resource is enabled.

3. The method of claim 1, wherein the external cluster is collocated with the cluster.

4. The method of claim 1, wherein receiving the information indicating that the external resource is enabled comprises: invoking, using the proxy resource, the command of the external cluster.

5. The method of claim 1, further comprising:
in response to receiving information that the external resource is disabled, reconfiguring the state of the external resource to reflect that the external resource is not enabled, wherein the state of the proxy resource remains unchanged.

6. The method of claim 1, further comprising:
in response to receiving information that the external resource is disabled, disabling the resource.

7. A system, comprising:
a hardware platform;
a native cluster comprising a resource;
wherein the external cluster executes on the hardware platform;
an external cluster comprising an external resource;
a native cluster framework configured to execute on the native cluster and control the resource of the native cluster;
a proxy resource located in the native cluster, wherein the proxy resource is associated with the external resource controlled by the external cluster;
wherein the native cluster framework is configured to:
    make a determination that the resource in a cluster is dependent on the external resource;
    based on the determination, creating a first dependency between the resource and the proxy resource and creating a second dependency between the proxy resource and the external resource;
    start, by the cluster framework, the proxy resource;
    configure in response to the starting of the proxy resource, by the cluster framework, a state of the proxy resource to indicate that the proxy resource is in an online-standby state and a state of the external resource to indicate that the external resource is not enabled;
    determine an ordering to enable a set of resources including the resource and the external resource, wherein the ordering is based on dependencies of the set of resources and interleaves resources controlled by the native cluster framework and the external resource;
    enable the set of resources by enforcing at least the first dependency;
    receive, by the proxy resource, information indicating that the external resource is enabled;
    reconfigure, in response to receiving the information that the external resource is enabled, the state of the proxy resource to indicate that the proxy resource is online;
    starting, by the cluster framework, the resource in response to a determination that the state of the proxy resource indicates that the proxy resource is online and based on the first dependency and the second dependency, wherein the resource is configured to execute an instruction after the resource is started.

* * * * *